(12) United States Patent  
Waldhoer et al.

(10) Patent No.: US 9,149,885 B2
(45) Date of Patent: Oct. 6, 2015

(54) METHOD AND APPARATUS FOR THE PRODUCTION OF A WELDING SEAM OR A THREE-DIMENSIONAL STRUCTURE ON A SURFACE OF A METALLIC WORK PIECE

(71) Applicant: Fronius International GmbH, Pettenbach (AT)

(72) Inventors: Andreas Waldhoer, Pettenbach (AT); Stephan Schartner, Wels (AT)

(73) Assignee: Fronius International GmbH, Pettenbach (AT)

( * ) Notice: Subject to any disclaimer, the term of this patent is extended or adjusted under 35 U.S.C. 154(b) by 439 days.

(21) Appl. No.: 13/655,654

(22) Filed: Oct. 19, 2012

(65) Prior Publication Data

US 2013/0105450 A1    May 2, 2013

(30) Foreign Application Priority Data

Oct. 28, 2011    (AT) ................................ A 1592/2011

(51) Int. Cl.  
*B23K 26/00* (2014.01)  
*B23K 9/00* (2006.01)  
*B23K 9/04* (2006.01)  
*B23K 9/173* (2006.01)  
*B23K 9/20* (2006.01)  
*B23K 26/14* (2014.01)

(52) U.S. Cl.  
CPC ............... *B23K 9/0043* (2013.01); *B23K 9/044* (2013.01); *B23K 9/173* (2013.01); *B23K 9/20* (2013.01); *B23K 26/1429* (2013.01); *B23K 2203/14* (2013.01)

(58) Field of Classification Search  
CPC ........... B23K 2203/14; B23K 26/1429; B23K 9/0043; B23K 9/173; B23K 9/20  
USPC .......................................... 219/121.6–121.72  
See application file for complete search history.

(56) References Cited

U.S. PATENT DOCUMENTS 4,564,736 A * 1/1986 Jones et al. ................ 219/121.6  
5,006,688 A   4/1991 Cross  
(Continued)

FOREIGN PATENT DOCUMENTS

AT    413 667 B    4/2006  
AT    506 217      7/2009  
(Continued)

OTHER PUBLICATIONS

English Translation of JP2008-093718, Apr. 2008.*

(Continued)

*Primary Examiner* — Sang Y Paik  
(74) *Attorney, Agent, or Firm* — Collard & Roe, P.C.

(57) ABSTRACT

The invention relates to a method and an apparatus (1) for the production of a welding seam or a three-dimensional structure (26) on a surface of a metallic work piece (14) with the help of a welding torch (7) for carrying out a welding process with a welding wire (9) guided in a welding torch (7), whereby an electric arc (13) is ignited between the welding wire (9) and the work piece (14), and for stabilizing the electric arc (13) a laser (27') for emitting a laser beam (27) with a maximum power of 2000 W is arranged, with a point of impact being on that position of the work piece (14) where the welding seam or structure (26) is produced. An improvement of the stabilization of the electric arc (13) is obtained if the laser (27') is connected to a means (28) for the control of the laser (27'), which control means (28) is designed to activate the laser beam (27) prior to the ignition of the electric arc (13).

21 Claims, 5 Drawing Sheets

(56) References Cited

U.S. PATENT DOCUMENTS

| | | | |
|---|---|---|---|
| 6,664,507 B2* | 12/2003 | Akaba et al. | 219/130.5 |
| 8,471,173 B2 | 6/2013 | Miessbacher et al. | |
| 8,592,715 B2* | 11/2013 | Wang et al. | 219/121.64 |
| 8,653,417 B2* | 2/2014 | Peters | 219/137.61 |
| 2003/0222059 A1 | 12/2003 | De Kock et al. | |
| 2005/0284853 A1 | 12/2005 | Takahashi et al. | |
| 2007/0251927 A1* | 11/2007 | Miessbacher et al. | 219/121.63 |
| 2011/0073579 A1 | 3/2011 | Artelsmair et al. | |

FOREIGN PATENT DOCUMENTS

| | | |
|---|---|---|
| CN | 101811231 | 8/2010 |
| DE | 100 57 187 A1 | 5/2002 |
| EP | 1 609 557 A1 | 12/2005 |
| JP | 2008-093718 * | 4/2008 |
| WO | 03/102260 A2 | 12/2003 |
| WO | WO 2006/133034 | 12/2006 |
| WO | WO 2011/076109 | 6/2011 |

OTHER PUBLICATIONS

Austrian Office Action dated May 14, 2012 in Austrian Application No. A 1592/2011 with English translation of the relevant parts.

German Office Action dated May 23, 2014 in German Application No. 10 2012 218 487.2 with English translation of relevant parts.

* cited by examiner

METHOD AND APPARATUS FOR THE PRODUCTION OF A WELDING SEAM OR A THREE-DIMENSIONAL STRUCTURE ON A SURFACE OF A METALLIC WORK PIECE

CROSS REFERENCE TO RELATED APPLICATIONS

Applicants claim priority under 35 U.S.C. §119 of Austrian Application No. A 1592/2011 filed on Oct. 28, 2011, the disclosure of which is incorporated by reference.

The present invention relates to a method for the production of a welding seam or a three-dimensional structure on a surface of at least one metallic work piece, preferably made of titanium or a titanium alloy, with the help of a welding process, whereby an electric arc is ignited between a welding wire guided in a welding torch and the work piece, and the welding seam or structure is produced by the welding wire, whereby for stabilising the electric arc a laser beam having a maximum power of 2000 W is used, which laser beam is directed to that position on the surface of the work piece on which the welding seam or structure is produced.

Furthermore, the invention relates to an apparatus for the production of a welding seam or a three-dimensional structure on a surface of at least one metallic work piece, preferably made of titanium or a titanium alloy, with the help of a welding torch for carrying out a welding process with a welding wire guided in the welding torch, whereby an electric arc is ignited between the welding wire and the work piece, and for stabilising the electric arc a laser for emitting a laser beam having a maximum power of 2000 W is arranged, with a point of impact being on that position on the surface of the work piece, where the welding seam or structure is produced.

Apparatuses and methods, in which the electric arc of a welding machine is stabilised by a laser beam, are known, for example, from WO 2006/133034 A1, WO 2011/076109 A1 or CN 101811231 A.

In particular, in the welding of work pieces made of titanium or a titanium alloy, the use of active gases (e.g. $CO_2$ or $O_2$) is not desired, since these will react with the material of the work piece and result in oxidation and consequently in embrittlement of the connecting site. The omission of active gases, however, also leads to the elimination of the light-stabilising effect of active gases, for which reason instabilities of the electric arc and, as a result thereof, deteriorations in the welding quality will entail. Thus, the electric arc does not stay on one point of the surface but moves to and fro thereon.

Due to their low specific weight, work pieces made of titanium or a titanium alloy are frequently used in the aircraft industry. To connect such work pieces with composites, in particular carbon composites (CFRP carbon fibre reinforced plastics), which are likewise widely used in the aircraft industry, it is common to arrange three-dimensional structures on the surface of the metallic work piece, mainly in the form of short rods or pins, to which the composites can be connected. An apparatus and a method for the production of such three-dimensional structures on a surface of a metallic work piece are known, e.g. from AT 506 217 B1. Due to the above cited inadmissible application of active gases difficulties will also arise in the production of such three-dimensional structures due to the instabilities of the electric arc. As a result, the connection of the three-dimensional structures to the surface of the metallic work piece may turn out to be not stable enough. Countermeasures such as an increase in the electric arc power, which results in an increase in the heat input, are not expedient in particular in the case of very thin work pieces (e.g. <1 mm), since they would lead to inadmissible distortion of the work pieces.

Even though the description of the subject-matter is directed towards work pieces made of titanium or titanium alloy, the measures are advantageous also in the case of work pieces made of other equivalent materials, such as aluminium, aluminium alloys, galvanised steel, chromium-nickel steel or the like.

The object of the present invention is to create an above-mentioned method and an above-mentioned apparatus for the production of a welding seam or a three-dimensional structure on a surface of a metallic work piece, wherein the welding quality can be increased. Furthermore, positioning of the three-dimensional structure is to be improved, in particular, a reduction of the distances of the individual three-dimensional structures to one another is to be achieved.

In terms of process engineering, the object according to the invention is solved in that the laser beam is activated prior to the ignition of the electric arc. The electric arc can be stabilized by the laser having a relatively low power, even without the use of an active gas, and the electric arc can be prevented from dancing around the desired base point during the welding process. By using the low-energetic laser, the oxide layer is vaporised on the surface of the work piece and, in addition, the air above the work piece surface is pre-ionized, thereby creating optimum conditions for the electric arc of the welding process. The supporting use of a laser constitutes a simple measure to improve the welding results in the welding of work pieces made in particular of titanium or titanium alloys. The point where the welding seam and/or structure is to be produced is pre-heated by the supporting laser beam, and the contact resistance is reduced, thus making it possible to produce a higher-quality welding seam and/or structure. Activating the laser beam prior to the ignition of the electric arc can assist in igniting the electric arc, since the work piece surface is pre-heated by the laser and cleaned by means of removing any possible oxide layers. In the production of three-dimensional structures in the form of individual pins, the base point of the pins is narrower, since the electric arc is stabilized and does not dance around, thereby making it possible to arrange the three-dimensional structures and/or pins in a more narrow manner on the surface of the metallic work piece. As a matter of fact, if the electric arc were dancing around on the surface and it is desired to place the three-dimensional structures as close as possible to one another, it can happen that the electric arc jumps to an already set three-dimensional structure in an uncontrolled manner and destroys the same. Therefore, it has been possible so far to build up the three-dimensional structures in such difficult materials at a relatively large distance only, which, however, is not advantageous, since in order to obtain a high strength or joining force of a composite material to be joined as many such three-dimensional structures as possible are required.

Advantageously, the laser beam is activated in dependence on a value of a welding parameter, in particular, in dependence on an increase in the welding current. Thus, the electric arc can be stabilized synchronously with the activation of the electric arc.

Optimum results can be achieved whenever the laser is activated a predetermined period of time prior to the ignition of the electric arc, preferably 30 ms to 60 ms prior to the ignition of the electric arc, and during the ignition of the electric arc. Such a preliminary laser application is particularly advantageous in contactless ignition of the electric arc with work pieces made of galvanised steel, aluminium or the like. This creates pre-heating and pre-ionizing, whereby the electric arc is very quickly stabilized after ignition.

In the production of three-dimensional structures on the surface of the work piece, for assisting the severing of the welding wire at a specified height relative to the surface of the work piece, the laser beam can additionally be directed to the welding wire and be activated. The height adjustment of the severing of the welding wire in the prior art without the influence of the laser beam is defined above all by the duration of the cooling phase after fixing the welding wire on the surface of the work piece, the final temperature obtained at the end of the cooling phase being decisive. This results in geometry- and material-dependent maximum and minimum heights. By means of selectively positioning the laser beam on the welding wire at the desired height, additional heat may be introduced into the welding wire and the severing of the welding wire at the desired height be set independently thereof. In this manner, three-dimensional structures, in particular pins, can be produced at a desired height in optimum quality. When assisting the severing of the welding wire, the welding torch does not change its position, whereas the direction of the laser beam is altered, i.e. the laser beam is redirected from the surface of the work piece and to the welding wire.

The object according to the invention is also solved by an above-cited method for the production of a three-dimensional structure on a surface of a metallic work piece with the help of a welding process, whereby, for supporting the severing of the welding wire, the laser beam is directed onto the welding wire at a predetermined height from the surface of the work piece and is activated there.

In accordance with a feature of the invention, for the severing of the welding wire while the laser beam is directed and activated at the predetermined height from the surface of the work piece and onto the welding wire, the electric arc is extinguished or the power source is deactivated, respectively. Thus, an exact severing of the welding wire at the defined height can be achieved.

Advantageously, the point of impact or focal point of the laser beam can be adjusted. The adjustment can be made manually, for example, with corresponding adjusting screws, or automatically by means of corresponding drive units. The adjustment device can also be integrated in the processing optics of the laser.

A suitable welding process is in particular a so-called CMT (cold metal transfer) welding process with a forward/backward movement of the welding wire, which process distinguishes itself by an especially low heat input. Such a welding process can also be applied in a suitable manner in especially thin work pieces, since due to the low heat input in the work piece there occurs hardly any distortion on the work piece.

In particular, an infrared laser beam is suited as a laser beam.

Even if the use of active gases in work pieces, made in particular of titanium or a titanium alloy, is inadmissible due to the above described problems, shielding gases can be used to improve the welding results, in which connection noble gases, in particular, argon is especially suited.

The object according to the invention is also solved by an above-cited apparatus for the production of a welding seam or a three-dimensional structure on the surface of a metallic work piece, preferably made of titanium or a titanium alloy, in which the laser is connected with a means for controlling the laser, which control means is designed to activate the laser beam prior to the ignition of the electric arc. With regard to the advantages obtainable thereby, reference is made to the above description of the method for the production of a welding seam or a three-dimensional structure on a surface of a metallic work piece.

Advantageously, the control means of the laser is adapted to activate the laser prior to the ignition of the electric arc, preferably in a period of time of 30 ms to 60 ms prior to the ignition of the electric arc, and during the ignition of the electric arc.

In order to be able to optimally adjust the point of impact or focal point of the laser beam, a means for adjusting the point of impact of the laser beam is preferably provided. As pointed out above, said adjusting means can composed of mechanical elements such as adjusting screws or electro-mechanical elements such as corresponding actuating drives.

When a means for adjusting the point of impact or the focal point of the laser beam in a direction perpendicular to the surface of the work piece is provided, assisting the severing of the welding wire can take place at a desired height from the surface of the work piece.

Such an adjusting means may be formed by a controlled deflection mirror arranged in front of the laser. Instead the deflection mirror, a moving lens, a prism or the like can also be used.

As mentioned above, an infrared laser for emitting an infrared laser beam is provided as laser.

For further improving the welding result, the welding torch can be connected to a line for the supply of argon as shielding gas.

Finally, an embodiment is also advantageous in which, for the severing of the welding wire, the power source for applying energy on the welding wire is deactivated and the laser beam is focussed at a predetermined height from the surface of the work piece and onto the welding wire, since thereby a severing of the welding wire at exactly the defined height can be obtained.

Figure 1:
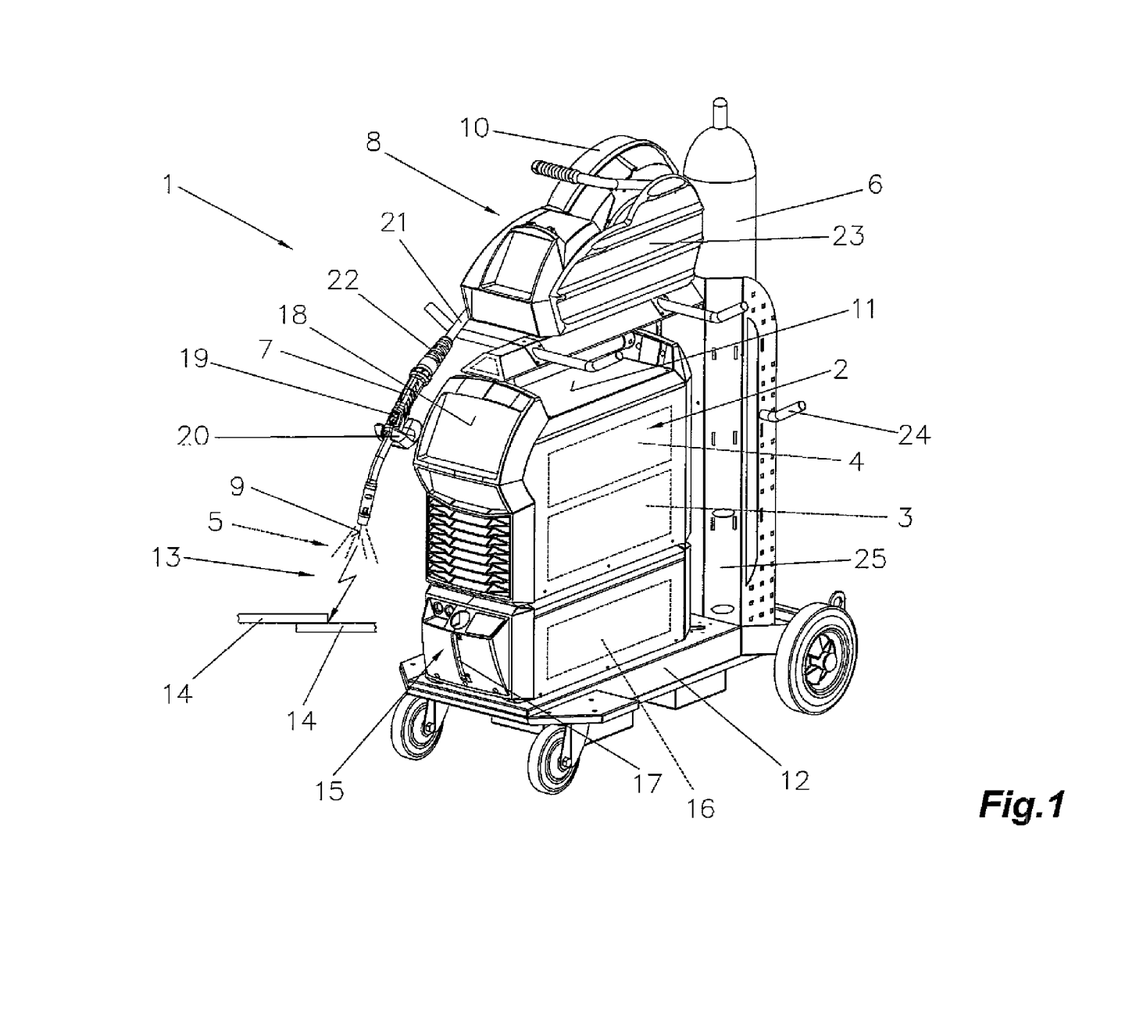
FIG. 1 shows a schematic view of a welding apparatus.

The present invention will be described in more detail with reference to the enclosed schematic drawings in which:

FIG. 1 shows a welding apparatus 1 for a large range of processes or methods, such as e.g. MIG/MAG, WIG/TIG, electrode welding, double wire/tandem welding processes, plasma or soldering methods, etc.

The welding apparatus 1 comprises a power source 2 with a power unit 3 arranged therein, a control means 4 and further components and lines (not shown), such as e.g. a switch-over element, control valves, etc. For instance, the control means 4 is connected to a control valve arranged in a supply line for a shielding gas 5 between a gas storage 6 and a welding torch 7.

In addition, via the control means 4, a device 8 for conveying a welding wire 9 from a delivery drum 10 or a wire coil to the area of the welding torch 7 can also be controlled, such as e.g. is common for MIG/MAG welding. Of course, the conveyance device 8 may also be integrated in the welding apparatus 1, in particular, in housing 11 of the power source 2 and not be positioned as an additional device on a carriage 12, as shown in FIG. 1. The conveyance device 8 for the welding wire 9 may also be placed directly on the welding apparatus 1, whereby the housing 11 of the power source 2 is designed on the top for receiving the conveyance device 8, and the carriage 12 can be omitted.

The welding wire 9 can also be supplied from a conveyance device 8 outside the welding torch 7 to the process point, whereby preferably an electrode which cannot be melted is arranged in the welding torch 7, as is common in WIG/TIG welding.

The current for establishing an electric arc 13 between the welding wire 9 and a work piece 14 composed of one or several parts is supplied via a welding line (not shown) from the power unit 3 of the power source 2 and to the welding torch 7. The work piece 14 is connected to the power source 2 via a further welding line (not shown) for the further potential, in particular an earth cable, whereby an electric circuit for a process can be built up via the electric arc 13.

For cooling the welding torch 7, the latter is connected, via a cooling device 15 by means of interconnecting possible components, such as e.g. a flow monitor, to a liquid container, in particular to a water container 16 with a level indicator 17. When operating the welding torch 7, the cooling device 15, in particular a liquid pump used for the liquid disposed in the water container 16, is started, thus causing cooling of the welding torch 7. As is illustrated in the shown embodiment, the cooling device 15 is positioned on the carriage 12, on which subsequently the power source 2 is placed. The individual components of the welding apparatus 1, i.e. the power source 2, the wire conveyance device 8 and the cooling device 15 are designed in such a way that they include corresponding projections or recesses, so that they can be stacked or placed safely one upon another.

The welding apparatus 1, in particular the power source 2 further comprises an input and/or output device 18 via which a large number of welding parameters, modes of operation or welding programmes of the welding apparatus 1 can be adjusted and retrieved and/or displayed. The welding parameters, modes of operation or welding programmes adjusted via the input and/or output device 18 are forwarded to the control means 4, and subsequently said control means triggers the individual components of the welding apparatus 1 and/or specifies corresponding target values for the regulation or control. In the use of a corresponding welding torch 7, adjustment operations can also be carried out via the welding torch 7, for which reason the welding torch 7 is equipped with a welding torch input and/or output device 19. Preferably, the welding torch 7 is connected via a data bus, in particular a serial data bus, to the welding apparatus 1, in particular to the power source 2 or the conveying device 8. For starting the welding process, the welding torch 7 usually comprises a start switch (not shown), the actuation of which can ignite the electric arc 13. To be protected from radiant heat emanating from the electric arc 13, the welding torch 7 can be equipped with a heat shield 20.

In the shown embodiment, the welding torch 7 is connected to the welding apparatus 1 via a hose package 21, the hose package 21 being able to be mounted to the welding torch 7 by a support sleeve. In the hose package 21, the individual lines, such as e.g. the supply line, lines for the welding wire 9, the shielding gas 5, the cooling circuit, the data transmission etc. are arranged from the welding apparatus 1 and to the welding torch 7, whereas the earth cable is connected to the power source 2 preferably in separate fashion. Preferably, the hose package 21 is connected via a coupling means (not shown) to the power source 2 or the conveying device 8, whereas the individual lines in the hose package 21 are fixed to or in the welding torch 7 with a support sleeve. So as to ensure corresponding strain relief of the hose package 21, the latter can be connected via a strain relief means to the housing 11 of the current source 2 or the conveying device 8 (not shown).

Basically, not all of the above mentioned components must be used or employed for the different welding processes and/or welding apparatuses 1. The welding torch 7 may also be designed as an air-cooled welding torch 7 and the cooling means 15 may be omitted. The welding apparatus 1 is formed at least by the power source 2, the conveying device 8 and at best the cooling means 15, whereby these components may also be arranged in a joint housing 11. In addition, other parts or components, such as e.g. a grinding protection 23 on the wire conveyance device 8 or an option carrier 24 on a holding means 25 for the gas storage 6 etc. may be arranged.

The embodiment of a welding apparatus 1 shown in FIG. 1 constitutes only one of many options. In particular, the welding apparatuses 1 may vary with respect to the supply of the welding wire 9, the length of the hose package 21, the type, position and number of conveyance devices 8 for the welding wire 9, the presence of a wire buffer (not shown) and much more.

Figure 2:
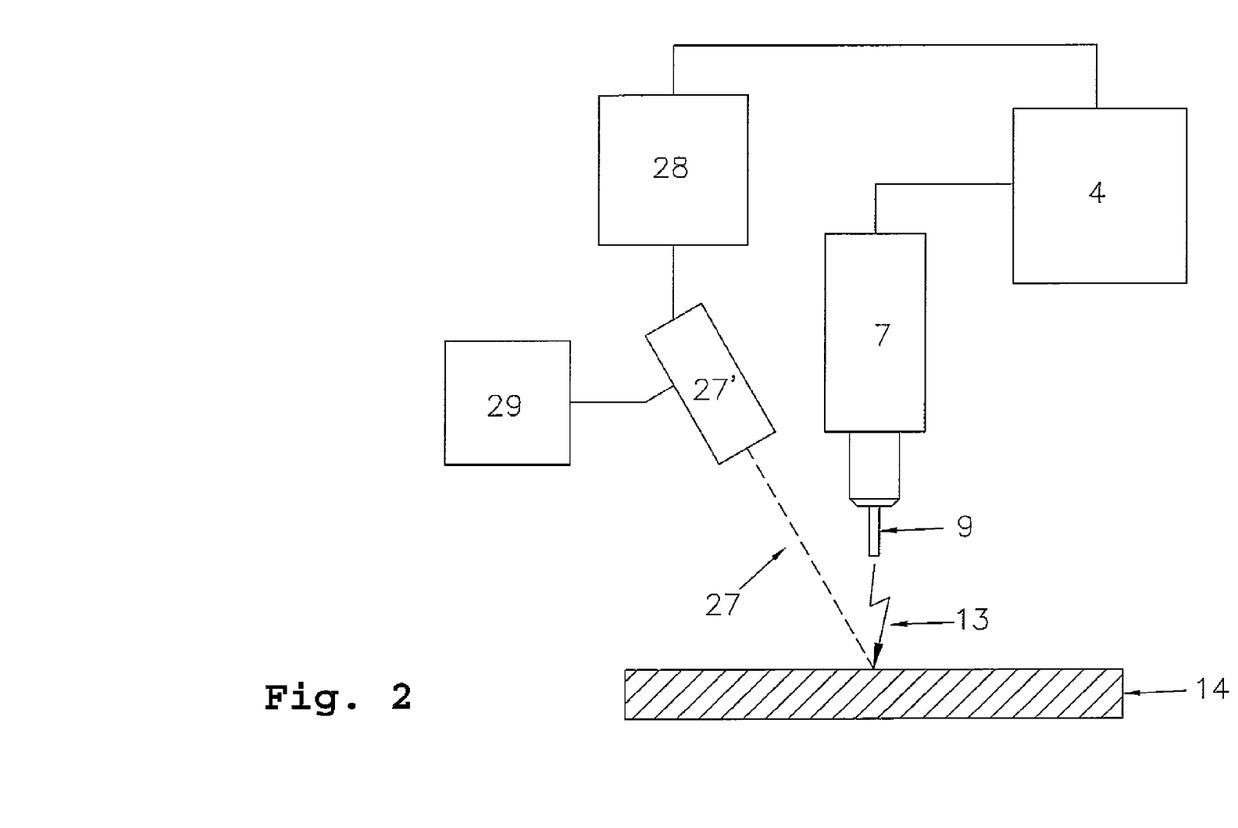
FIG. 2 shows an embodiment of an apparatus for the production of a welding seam or a three-dimensional structure on a surface of a metallic work piece.

FIG. 2 shows an embodiment of an apparatus for the production of a welding seam or a three-dimensional structure 26 on a surface of a metallic work piece 14. Accordingly, for carrying out the welding process a welding torch 7 is provided, which is connected to a control means 4. A welding wire 9 is guided in the welding torch 7, and an electric arc 13 is ignited between the welding wire 9 and the work piece 14. In accordance with the invention, to stabilize the electric arc 13, a laser 27' for emitting a laser beam 27 having a maximum power of 2000 W, preferably a maximum of 400 W to 700 W, is arranged, with a point of impact of the laser beam 27 being on that position on the surface of the work piece 14 on which the welding seam or structure 26 is to be produced. Accordingly, the electric arc 13 is also directed on this point of impact. The laser 27' is connected to a means 28 for the control of the laser 27', which means is designed to activate the laser beam 27 prior to, during and/or after the ignition of the electric arc 13. Accordingly, the control means 28 of the laser 27' is connected to the control means 4 of the welding torch 7 and/or the welding apparatus 1. For adjusting the point of impact or focal point of the laser beam 27, a corresponding adjustment means 29 may be provided. Said adjustment means 29 can be formed by corresponding adjustment screws or actuating drives (not shown). In accordance with the invention, the electric arc 13 is stabilized by means of activating the laser beam 28 with low power, whereby also in work pieces 14, preferably made of titanium or titanium alloys, good welding results can be achieved. In particular, in the production of three-dimensional structures 26 on the surface of the work pieces 14, for instance, for the connection of a work piece 14 made of titanium or a titanium alloy to carbon fibre composites, good results and optimum connections of the three-dimensional structure 26 to the work piece 14 can be obtained.

Figure 3A:
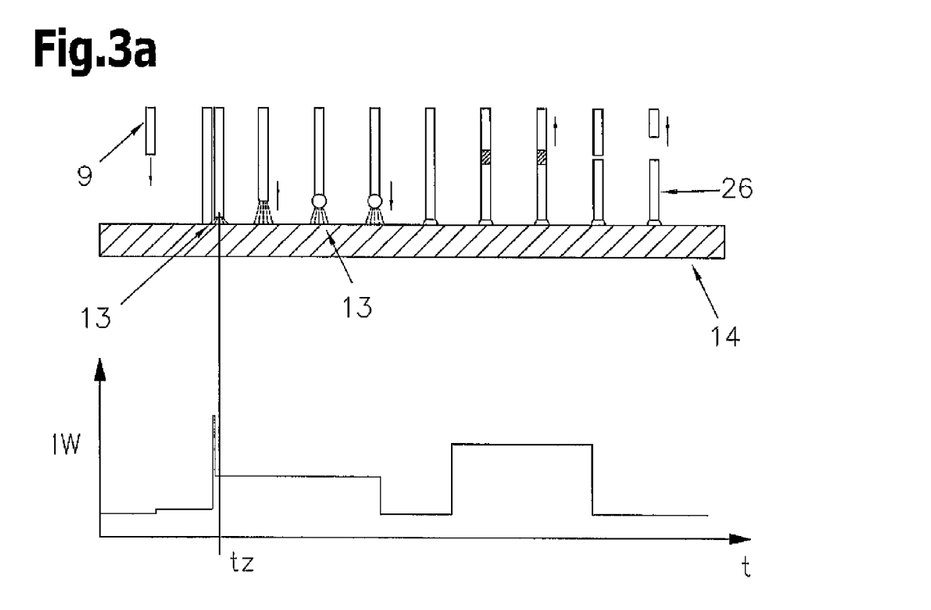
FIGS. 3*a* to 3*d* schematically show chronological sequences of a method for the production of a three-dimensional structure on a surface of a metallic work piece.

FIGS. 3a to 3d show schematically chronological sequences of a method for the production of a three-dimensional structure 26 on a surface of a metallic work piece 14. In principle, FIG. 3a shows the production of a three-dimensional structure 26 on the surface of a metallic work piece 14. Below the schematic principle depiction of the position of the welding wire 9, the chronological sequence of the welding current IW is shown in FIG. 3a. For igniting the electric arc 13, the welding wire 9 is moved towards the surface of the work piece 14 and after having contacted the surface of the work piece 14 the welding wire 9 is again moved away from the work piece 14. During a phase of increased welding current IW, the electric arc 13 is ignited (point in time tz).

Subsequently, a corresponding welding process, in particular a cold metal transfer welding process is applied to melt the tip of the welding wire 9 by means of a defined increase in the welding current IW and to connect it to the work piece 14.

For the severing of the welding wire 9, after a possible cooling phase of the welding wire 9, the welding wire 9 is again heated, for instance, by a corresponding current flow through the welding wire 9. Thus, a heat spot is formed in a defined area above the base point of the welding wire 9 or pin fused to the work piece surface. Now, when the welding wire 9 and/or the welding torch 7 is taken or moved back, the welding wire 9 may be severed at this location. By moving the welding wire 9 back and correspondingly controlling the welding parameters, in particular, of the welding current I and the wire conveyance speed v, severing of the welding wire 9 may take place at a defined height Δx and thus a three-dimensional structure 26 in the form of a pin can be produced. However, said heat spot cannot be defined exactly, which is why certain deviations may arise in terms of the height position of the produced three-dimensional structure 26.

Figure 3B:
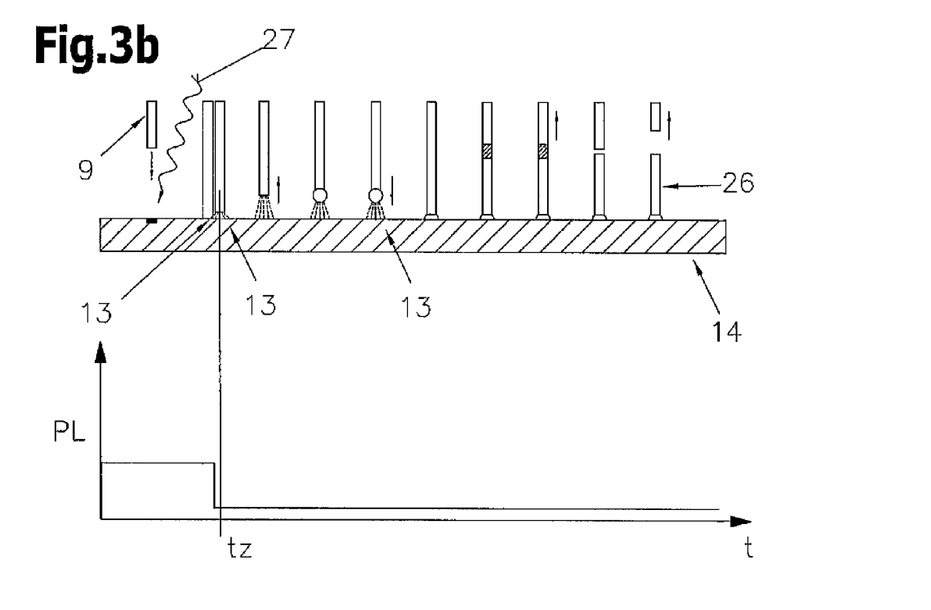

FIG. 3b shows the method according to the invention, wherein the laser beam 27 is used to assist the ignition of the electric arc 13. Accordingly, prior to the ignition of the electric arc 13 at time period tz, the laser beam 27 is activated and the ignition of the electric arc 13 is supported. Preferably, the laser beam 27 is activated essentially at the same time as the wire conveyance. That is to say that the start of the forward movement of the welding wire 9 activates the laser beam 27. Thus, the laser beam 27 and the wire conveyance are synchronized accordingly. A contactless ignition of the electric arc 13 may also be achieved by pre-ionising the air above the work piece 14 by the laser beam 27. The positive influence of the laser beam 27 on the pre-ionization could be shown clearly with high-speed recordings of the welding process, so that the electric arc 13 burns or is ignited exactly in that area which is pre-ionized by the laser beam 27. Accordingly, the laser beam 27 is deactivated after ignition of the electric arc 13. Detection of the electric arc 13 is made, for instance, via measuring the voltage of the electric arc 13 and/or via the short-circuit detection. In the case of a short circuit, the current increases accordingly, due to which change of state the laser beam 27 is deactivated. Likewise, in the case of a short circuit, the voltage is zero, with the voltage increasing during or after the ignition of the electric arc 13, so that the ignition can easily be recognized also by monitoring the voltage of the electric arc 13.

Figure 3C:
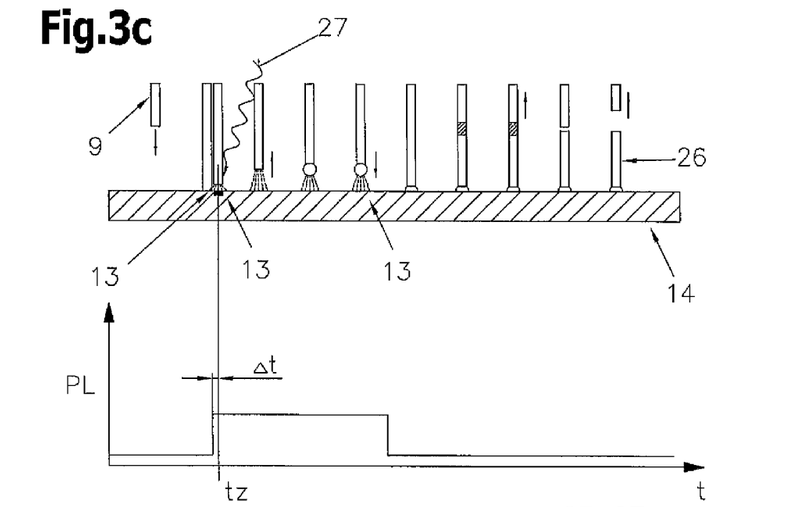

FIG. 3c shows the method according to the invention, wherein the laser beam 27 is activated for a period of time Δt prior to the ignition of the electric arc 13 and during the ignited electric arc 13 and thereby the stability of the electric arc 13 can be increased. The laser beam 27 can be activated in dependence on the feed rate of the welding wire 9 and/or on the basis of the short circuit detection. In this connection, the laser beam 27 is also active during the short circuit, whereby in said short circuit of the ignition phase no material transition takes place. For this, the laser beam 27 is preferably laterally directed to the base point of the structure, so that it acts in the transition area from the structure to the work piece 14, if possible. The period of time Δt for which the laser beam 27 is activated prior to the ignition of the electric arc 13 is preferable 30 ms to 60 ms. Accordingly, the laser beam 27 is deactivated with the next following short circuit with material transition. The laser beam 27' can be activated on every new ignition of the electric arc 13, so that a corresponding stabilisation of the electric arc 13 is guaranteed.

Figure 3D:
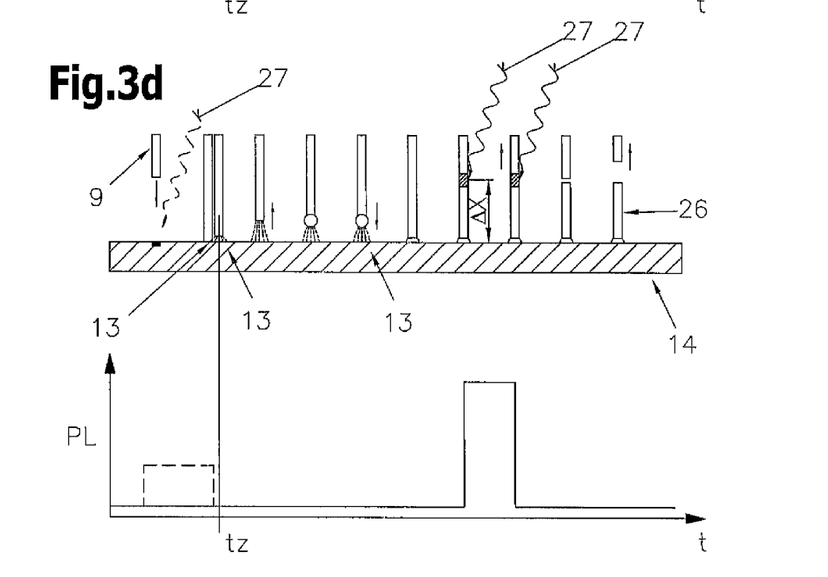

In FIG. 3d, a further variant of the method according to the invention is shown, in which the laser beam 27 is adjusted in a direction perpendicular to the surface of the work piece 14, so that the point of impact of the laser beam 27 on the welding wire 9 is at a predetermined height Δx from the surface of the work piece 14. By means of heat input in the welding wire 9 at the predetermined height. Δx from the surface of the work piece 14, tearing off or severing the welding wire 9 at this predetermined height Δx is assisted in the backward movement of the welding wire 9; thus, it is possible to produce three-dimensional structures 26 having a prescribed height Δx. For the purpose of severing, the current for this phase is increased accordingly, so that the laser beam 28 is activated upon the current increase and deactivated again upon the current reduction. After a corresponding cooling phase, the laser 27' can be re-activated for stabilizing the electric arc 13. Contrary to the prior art according to FIG. 3a, the supporting effect of the laser 27' allows to accurately adjust the point where the welding wire 9 is to be severed. When the laser beam 27 is directed or focused at the predetermined height Δx from the surface of the work piece 14 and onto the welding wire 9, heating takes place at the point of impact, whereby the heat spot formed by the current flow through the welding wire 9 is formed exactly at the desired point.

Figure 4:
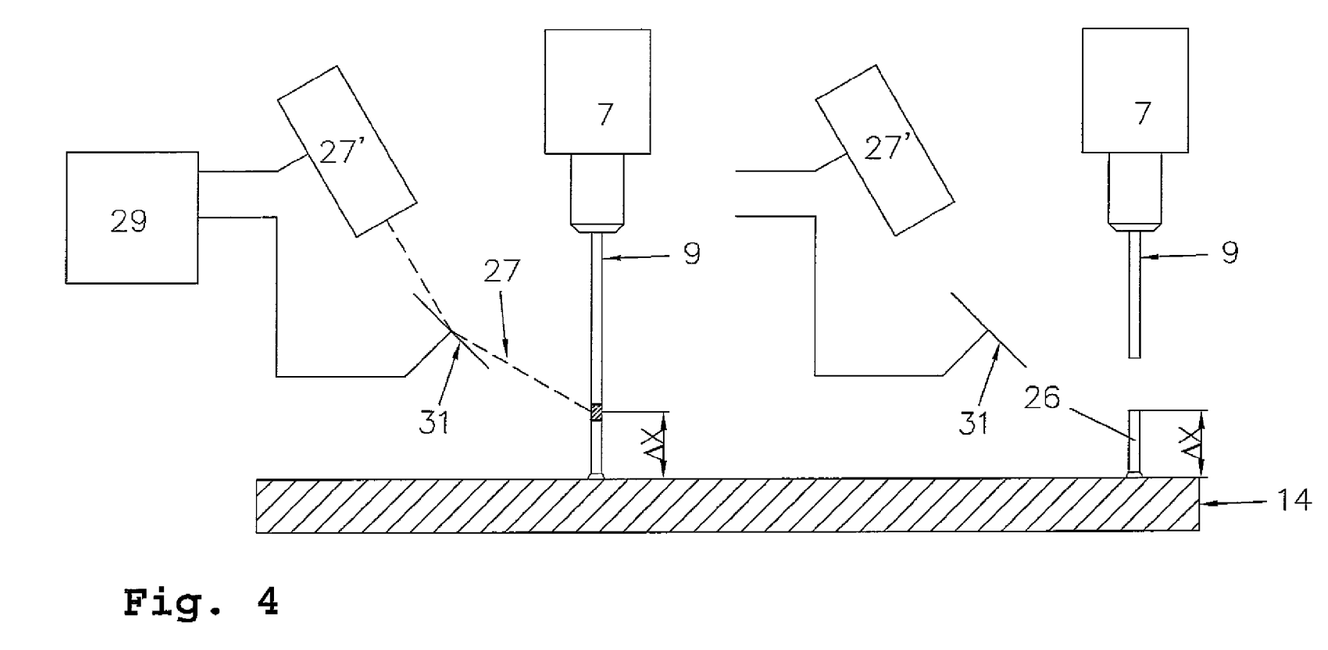
FIG. 4 schematically shows the production of a three-dimensional structure having a predetermined height on the surface of a metallic work piece.

FIG. 4 shows an embodiment of an apparatus for carrying out the method last described in connection with FIG. 3d for the production of three-dimensional structures 26 in the form of pins having a predetermined height Δx. For adjusting the laser beam 27 in a direction perpendicular to the surface of the work piece 14, a corresponding adjustment means 30 is arranged. This means can be formed by a controlled deflection mirror 31. The laser beam 27 is deflected by the deflection mirror 31 and directed to the desired location on the welding wire 9 and corresponding heat is introduced there. In the backward movement of the welding wire 9, the welding wire 9 is torn off or severed at the desired point and the result is a pin having the desired height Δx. In this manner, a plurality of pins can be produced on the surface of a work piece 14, which for example may serve to connect the metallic work piece 14 to CFK composites in the aircraft industry or in shipbuilding.

When aligning or focussing the laser beam 27 on the welding wire 9, the energy supply via the power source 2 may also be interrupted, i.e. the power source 2 can be deactivated or the electric arc 13 can be extinguished and the welding wire 9 can be cut off by the laser beam 27 at the predetermined height Δx.

In the solution according to the invention it is essential that a defined area on the work piece 14 is ionized and, if required, heated by the laser beam 27, so that the electric arc 13 is ignited exactly in that area and also burns within this range. Thus, exact positioning of the electric arc 13 is obtained, which does not move around on the surface of the work piece 14, as is the case in the prior art without ionization and heating. Due to this so-called "constriction" of the electric arc 13, three-dimensional structures 26 or pins can be placed very close together, since the electric arc 13 no longer tends to move around on the surface of the work piece 14. If the electric arc 13 were to move around, as is the case in prior art, the three-dimensional structures 26 or pins would have to be positioned with sufficiently large distances relative to one another so that the moving electric arc 13 does not hit the neighbouring structures 26 or pins. In case the electric arc 13 hits an already set pin, said pin would be destroyed, since it would be melted due to the heat effect from the electric arc 13. Thus, it must be ensured that the electric arc 13 is burning always on the desired location on the surface of the work piece 14 and does not jump over to any other pin already set.

For this purpose, the intensity of the laser beam 27 for the ionization and heating may be adapted in accordance with the material used. Even in pins to be set very close together, the laser power may be increased, in order to create a very limited, highly ionized area.

The invention claimed is:

1. A method for the production of a three-dimensional structure (26) on a surface of a metallic work piece (14) made of titanium or a titanium alloy using a welding method, the method comprising the following steps:
   activating a laser beam (27) having a maximum power of 2000 W,
   directing the laser beam (27) to that position on a surface of the work piece (14) on which the structure is produced,
   igniting an electric arc (13) between a welding wire (9) guided in a welding torch (7) and the work piece (14),
   producing the three dimensional structure with the welding wire, and
   severing the welding wire (9) by directing the laser beam (27) onto the welding wire (9) at a predetermined height ($\Delta x$) from the surface of the work piece (14) and activating the laser beam there;
   wherein the laser beam (27) is ignited prior to the ignition of the electric arc (13) and stabilizes the electric arc during welding.

2. The method according to claim 1, wherein the laser beam (27) is activated based on an increase in a welding current (IW).

3. The method according to claim 1, wherein the laser beam (27) is activated a predetermined period of time ($\Delta t$) prior to the ignition of the electric arc (13), and during the ignition of the electric arc (13).

4. The method according to claim 1, wherein the electric arc is extinguished during the step of deflecting the laser beam.

5. The method according to claim 1, further comprising adjusting a point of impact of the laser beam (27).

6. The method according to claim 1, wherein the welding process used is a CMT (cold metal transfer) welding process with a forward/backward movement of the welding wire (9).

7. The method according to claim 1, wherein the laser beam (27) is an infrared laser beam.

8. The method according to claim 1, wherein argon is used as shielding gas (5).

9. A method for the production of a three-dimensional structure (26) on a surface of a metallic work piece (14) using a welding process, comprising the following steps:
   igniting an electric arc (13) between a welding wire (9) guided in a welding torch (7) and the work piece (14),
   melting a tip of the welding wire (9) and moving the welding wire so that the welding wire is connected to the workpiece (14), and
   directing the laser beam (27) in a direction of the welding wire so that the laser beam severs the welding wire (9) in a predetermined height ($\Delta x$) from the surface of the work piece (14).

10. The method according to claim 9, wherein the electric arc is extinguished during the step of directing the laser beam.

11. The method according to claim 9, further comprising adjusting a point of impact of the laser beam (27).

12. The method according to claim 9, wherein the welding process used is a CMT (cold metal transfer) welding process with a forward/backward movement of the welding wire (9).

13. The method according to claim 9, wherein the laser beam (27) is an infrared laser beam.

14. The method according to claim 9, wherein argon is used as shielding gas (5).

15. An apparatus (1) for the production of a three-dimensional structure (26) on a surface of a metallic work piece (14) made of titanium or a titanium alloy, comprising:
   a welding torch (7) configured for carrying out a welding process with a welding wire (9) guided in the welding torch (7), whereby an electric arc (13) is ignited between the welding wire (9) and the work piece (14), and
   a laser for stabilizing the electric arc (13), the laser (27') emitting a laser beam (27) having a maximum power of 2000 W, and being positionable on the work piece (14) such that the laser beam contacts that position on the surface of the work piece (14) where the structure (26) is produced, and
   a control means (28) connected to the laser (27') for controlling the laser beam (27), said control means (28) being configured for activating the laser beam (27) prior to the ignition of the electric arc (13),
   wherein the laser is configured for severing the welding wire (9) at a predetermined height ($\Delta x$), by directing the laser beam (27) to the welding wire (9) at a predetermined height ($\Delta x$) from the surface of the work piece (14) and activating the laser beam (27) there, and deactivating a current source for forming the electric arc (13).

16. The apparatus (1) according to claim 15, wherein the control means (28) is adapted to activate the laser beam (27) in a period of time ($\Delta t$) of 30 ms to 60 ms prior to the ignition of the electric arc (13), and during the ignition of the electric arc (13).

17. The apparatus (1) according to claim 15, further comprising an adjusting means (29) for adjusting a point of impact of the laser beam (27).

18. The apparatus (1) according to claim 15, further comprising an adjusting means (30) for adjusting the point of impact of the laser beam (27) in a direction perpendicular to the surface of the work piece (14).

19. The apparatus according to claim 18, wherein the adjusting means (30) comprises a controlled deflecting mirror (31).

20. The apparatus (1) according to claim 15, wherein the laser (27') is an infrared laser for emitting an infrared laser beam.

21. The apparatus (1) according to claim 15, wherein the welding torch (7) is connected to a line (32) for the supply of argon as shielding gas (5).

* * * * *